United States Patent
Tsuboi (10) Patent No.: US 7,474,213 B2
(45) Date of Patent: Jan. 6, 2009

(54) OBJECT MANAGEMENT APPARATUS

(75) Inventor: Shoichi Tsuboi, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 298 days.

(21) Appl. No.: 11/194,066

(22) Filed: Jul. 29, 2005

(65) Prior Publication Data

US 2006/0036643 A1  Feb. 16, 2006

(30) Foreign Application Priority Data

Aug. 11, 2004 (JP) .............................. 2004-233970

(51) Int. Cl.
- G08B 13/14 (2006.01)
- G08G 1/123 (2006.01)
- G05B 19/00 (2006.01)
- H04Q 5/22 (2006.01)
- G06F 7/00 (2006.01)
- G06Q 10/00 (2006.01)

(52) U.S. Cl. .................. 340/572.1; 340/10.1; 340/5.92; 340/988; 700/215; 700/226; 700/229; 705/28

(58) Field of Classification Search ........................ None
See application file for complete search history.

(56) References Cited

U.S. PATENT DOCUMENTS

| | | | |
|---|---|---|---|
| 5,959,568 A * | 9/1999 | Woolley | 342/42 |
| 6,125,306 A * | 9/2000 | Shimada et al. | 700/217 |
| 6,600,418 B2 | 7/2003 | Francis et al. | |
| 7,176,801 B2 * | 2/2007 | Matsukawa et al. | 340/572.5 |
| 2004/0164844 A1 * | 8/2004 | Maeda et al. | 340/5.8 |

* cited by examiner

Primary Examiner—Julie Lieu
(74) Attorney, Agent, or Firm—Brinks Hofer Gilson & Lione (57) ABSTRACT

An object management apparatus is provided which can reliably and easily perform a confirmation operation of necessary objects depending on a destination when a vehicle travels. The object management apparatus comprises an object database for storing therein a list of necessary objects depending on the destination, a navigation device for setting a destination for travel of the vehicle, an object detector for detecting objects present in the vehicle, a missing-object determination section for comparing the actually detected objects with the list of the necessary objects corresponding to the destination to determine whether any object included in the list is missing or not, and a notification section for providing a notice when an object is missing.

18 Claims, 5 Drawing Sheets

```
DESTINATION GENRE: CAMPGROUND
  OBJECT LIST
            (NAME OF       (NUMBER OF
    (CODE)  OBJECT)        OBJECTS)    (ESSENTIALITY)     (WAY OF COPING)
  1. XXXX   TENT           1           ○            [RENTAL]  PURCHASE   OTHERS
  2. XXXX   SLEEPING BAG   2           ○            [RENTAL]  PURCHASE   OTHERS
  3. XXXX   TABLE          1           ○            [RENTAL]  PURCHASE   OTHERS
  4. XXXX   CHAIR          2           ○            [RENTAL]  PURCHASE   OTHERS
  5. XXXX   STOVE          1           ○            [RENTAL]  PURCHASE   OTHERS
  6. XXXX   FUEL           1           ○             RENTAL  [PURCHASE]  OTHERS
     ⋮       ⋮              ⋮           ⋮                      ⋮
```

OBJECT MANAGEMENT APPARATUS

BACKGROUND OF THE INVENTION

1. Field of the Invention

The present invention relates to object management apparatus for checking objects that are needed when a user travels.

2. Description of the Related Art

A purchase support system has hitherto been known which is designed to display a purchase list on a display device mounted in a vehicle when a user drives the vehicle to go out, as disclosed in, for example, JP-A-2002-123558, pages 3 and 4, FIGS. 1 to 4. In this system, data about the purchase list stored in a memory card is read by a vehicle-mounted device, so that the contents can be displayed. The user can confirm the contents of the purchase list inside the vehicle, thus eliminating the possibility of missing an article that the user intends to buy, or of repeatedly purchasing the same article.

Although in the system disclosed in the above patent document only the purchase list is displayed on the vehicle-mounted display device, any object list other than a purchase list may be displayed to allow the user to confirm the contents of the object list in the same way as the purchase list. For example, when the user travels to a leisure facility, displaying a list of necessary objects enables the user to check whether or not he/she has forgotten to bring something in the vehicle.

In the system disclosed in the above patent document, however, when various kinds of object lists including the purchase list are capable of being displayed, the user needs to select one of the lists depending on whether the purpose is to shop or to travel. This disadvantageously involves a complicated process. Alternatively, if the contents of all the usable object lists are displayed, the necessary objects should be selected from the objects displayed, depending on the destination. This operation must be performed by the user, which is also complicated.

Additionally, after selection of the object list, the user must check whether or not the objects included in the list were brought with the user or are in the vehicle as baggage. This checking operation is relatively complicated. For example, when the user loads the vehicle with various camping goods to go camping, the contents of the bag or the like should be checked again so as to confirm that the necessary camping goods are actually packed in the vehicle. In particular, when the number of necessary goods is large, such as camping goods, even if the user performs such a confirmation process, mistakes in the confirmation may occur which are difficult to eliminate completely.

SUMMARY OF THE INVENTION

The present invention has been accomplished in view of the foregoing problems encountered with the prior art, and it is an object of the invention to provide an object management apparatus that can surely and easily perform a confirmation operation of necessary objects depending on a destination when the vehicle goes out.

To solve the prior art problems, according to one aspect of the present invention, there is provided an object management apparatus comprising a destination-oriented object-list storage section for storing therein a list of necessary objects depending on a destination, a destination setting section for setting the travel destination of a vehicle, an object detector for detecting objects brought by a passenger in the vehicle, a missing-object determination section for comparing the object detected by the object detector with the list of necessary objects corresponding to the destination set by the destination setting section to determine whether any object included in the list is missing or not, and a missing-object notification section for providing a notice when an object is determined to be missing by the missing-object determination section. Thus, it is checked whether any necessary object corresponding to the set destination is missing or not, based on the objects brought by the user or present in the vehicle at that time. If something is missing, notice of the missing object is provided. Thus, the user does not need to examine various details, for example, which objects are needed for the destination, or whether or not there is any object not brought into the vehicle at that time. This enables the user to easily and reliably confirm the necessary objects without performing complicated operations.

The above missing-object notification section desirably gives the notice by providing a missing-object list. This permits the user to know what is missing simply by looking at the missing-object list, thereby saving the user from having to compare the objects actually present in the vehicle against the list.

The above missing-object list included in the notice given by the missing-object notification section desirably includes information indicative of the degree of necessity of each of the missing objects. This enables easy recognition of an object that should be preferentially prepared for from among a plurality of missing objects.

Further, the management apparatus desirably comprises an object cancellation section for designating an unnecessary object from among the objects included in the above missing-object list, and for canceling or deleting the designated object from the missing-object list. Thus, even when it is determined that there are missing objects, unnecessary objects among them can be deleted from the missing-object list.

Preferably, the management apparatus further comprises a destination-oriented object-list updating section for updating contents of the list stored in the destination-oriented object-list storage section based on contents deleted by the above object cancellation section. At the next time, the unnecessary object can be deleted from the list, thereby eliminating an unnecessary notice, thus avoiding the trouble of confirming the deleted contents.

Preferably, the management apparatus further comprises a destination-oriented object-list registration section for registering the list as described above in the destination-oriented object-list storage section depending on the corresponding destination. Thus, a new list can be additionally registered in the storage section according to the destination. That is, even if a new destination is added to the storage section and the number of the destinations stored in the storage section is increased, this makes it possible to confirm missing objects for the destination.

Further, the management apparatus preferably comprises an operation section to be manipulated by a user, the destination-oriented object-list registration section being operable to perform an edit operation including addition, modification or deletion of the object to or from the list, based on operational contents entered by the operation section. This can add a necessary object to the list or delete an unnecessary object from the list depending on the destination, thereby generating a new list reflecting a utilization plan or the like for every user to enhance the accuracy of the notified contents.

Preferably, a wireless tag containing the object information is attached to the object of interest to be detected by the object detector, and the apparatus further comprises a wireless tag reading section for reading the object information contained by the wireless tag in a wireless mode. The object detector preferably is operable to detect the object based on the object information read by the wireless tag reading section. This can automatically read out the object information without removing objects from the vehicle which have been loaded within the interior of the vehicle, thereby saving the trouble of reading out the object information.

The above wireless tag reading sections preferably are located at four corners within the interior of the vehicle having a substantially rectangular horizontal section. Thus, the entire space of the interior of the vehicle is easily set as a management area, so that all objects brought within the vehicle can be detected. Alternatively, the wireless tag reading section preferably may be located near the center of the ceiling within the interior of the vehicle. This can decrease the number of the wireless tag reading sections, while permitting setting of a wide management area. Alternatively, or additionally, the wireless tag reading section preferably may be located in a trunk of the vehicle. This can reliably detect objects located not only within the passenger cabin of the vehicle, but in the trunk thereof.

The above object detector preferably may detect the object at the time the destination is set by the destination setting section. This can detect the object appropriately and readily according to the destination.

The above object detector preferably may detect the object at the time the vehicle begins to travel. Thus, every time the vehicle begins to travel again after stopping, detection of the objects is performed to determine whether something is missing or not, thereby preventing objects from being left behind at the transit point or the like until the vehicle reaches the destination.

Further, the management apparatus preferably comprises a navigation device including a facility search section for designating a search condition and searching for a specific facility, and the facility searched for by the facility search section preferably may be used as the destination to be set by the destination setting section. Thus, the facility extracted utilizing the facility search function of the navigation device can be set as the destination, so that the desired destination can be set easily without performing a complicated operation.

The above navigation device preferably comprises a route search section for setting the facility searched for by the facility search section as the destination for the route search and for performing the route search process, and the destination set for the route search process preferably may be used as the destination to be set by the destination setting section. Thus, the destination to be used for the route search process in the navigation device can also be used to set the destination needed for the detection of missing objects, so that the setting operation can be simplified.

Preferably, the destination-oriented object-list storage section stores therein information on a facility at which the object included in the list is available, and the notice provided by the missing-object notification section includes the facility information corresponding to the missing object. This permits immediate supplementation of the missing object.

Preferably, the management apparatus further comprises a navigation device including a route search section for setting a specific facility as the destination for the route search and for performing a route search process, and the route search section can perform the route search process with the facility at which the missing object is available being set as a transit point or the destination for the route search. Thus, the vehicle can travel the appropriate route to the destination, while considering the facility which is capable of providing the missing object.

DESCRIPTION OF THE PREFERRED EMBODIMENTS

Now, an object management apparatus according to a preferred embodiment of the invention will be explained hereinafter with reference to the accompanying drawings.

Figure 1:
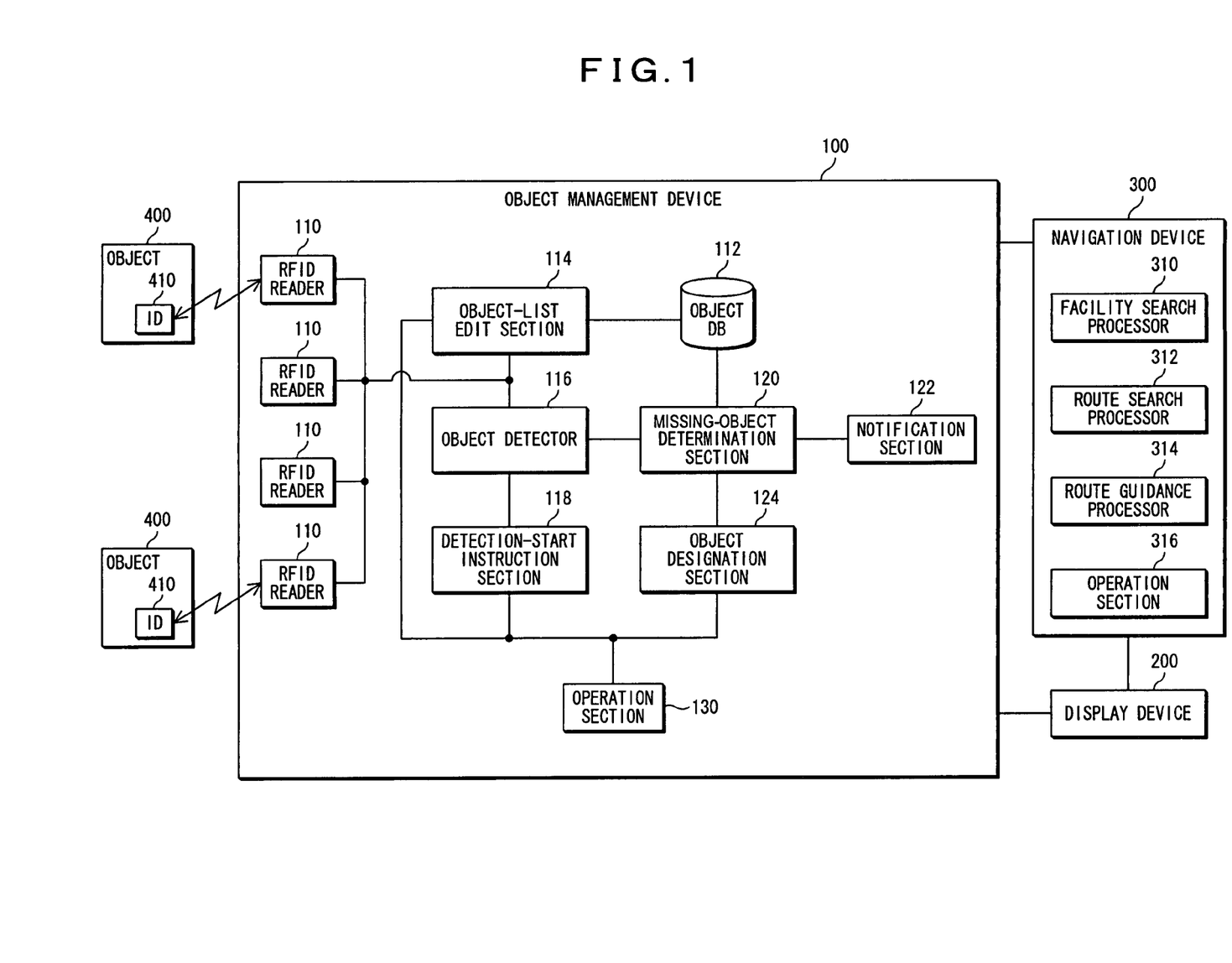
FIG. 1 is a diagram showing the general configuration of an object management apparatus according to one preferred embodiment.

FIG. 1 illustrates the general configuration of the object management apparatus of the present embodiment. As shown in FIG. 1, the object management apparatus of the embodiment includes an object management device 100, a display device 200, and a navigation device 300.

The object management device 100 detects what is missing among necessary objects corresponding to a destination when the destination is set, and notifies the user of a missing object. The management device includes a plurality (e.g. four) of RFID readers 110, an object DB (database) 112, an object-list edit section 114, an object detector 116, a detection-start instruction section 118, a missing-object determination section 120, a notification section 122, an object designation section 124, and an operation section 130. The object management device 100 is connected to the display device 200 for displaying various kinds of operation screens and notified information, and the navigation device 300 includes a function of determining whether or not the vehicle is in a location registered as home.

The RFID reader 110 carries out wireless communication with an RFID tag 410, which is a wireless tag attached to an object 400 of interest to be detected, to read out object information stored in a built-in memory of the RFID tag 410. For example, the four RFID readers 110 are located at four corners within the interior of the vehicle having a substantially rectangular horizontal section. Thus, the entire space of the interior of the vehicle can be easily set as a management area, so that all objects 400 brought within the vehicle can be detected. Alternatively, the RFID reader 110 may be located near the center of the ceiling within the interior of the vehicle. This can decrease the number of the RFID readers 110, thereby setting a wide management area. The RFID readers 110 may be located not only in the interior of the vehicle, but also in a trunk of the vehicle. This can reliably detect the objects 400 stored in the trunk as well as in the passenger cabin of the vehicle.

The object DB (database) 112 stores therein a destination-oriented necessary object list. "Destination-oriented", as the term is used herein, refers to a genre to which the destination belongs. This genre is not necessarily the same as that for a facility search or the like using the navigation device 300, and is determined based on whether or not the main necessary object is common among the destinations. For example, although ○○○ campground belongs to a genre of "campground", it may be put into one of two genres, e.g. "campground (sea)" and "campground (mountain)" based on whether it is located near the sea or river, or in the mountain so as to identify the necessary objects.

Figure 2:
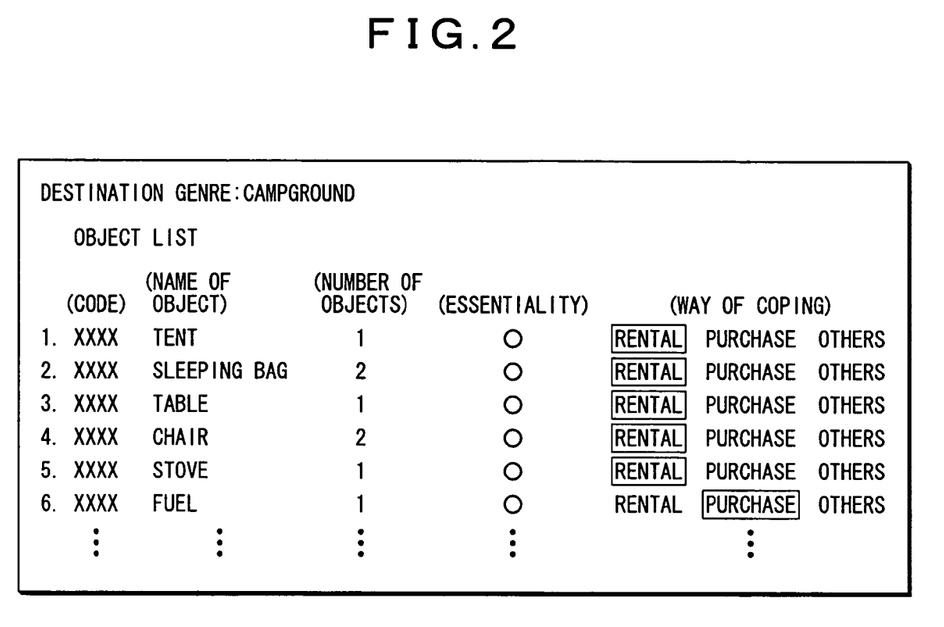
FIG. 2 is a diagram showing an example of a destination-oriented object list.

FIG. 2 illustrates an example of the destination-oriented object list, in which contents corresponding to the genre of "campground" are shown. This list includes not only object information including an object code for identification of a necessary object and a name of an object, but also other information including the number of necessary objects, essentiality (corresponding to information indicative of a degree of necessity of the object) and a way of coping when the object is missing (method of obtaining the object).

The object-list edit section 114 is operable to perform an edit operation including addition, modification or deletion of an object to or from the destination-oriented list, which is stored in the object DB 112. The object detector 116 performs a detection process for detecting an object 400 brought by a passenger riding in the vehicle. The detection process is carried out by reading the object information in the RFID tag 410 attached to each of the objects 400 using the RFID reader 110 in a wireless mode. The detection-start instruction section 118 instructs the object detector 116 to start the detection process (that is, gives a detection start instruction). The missing-object determination section 120, when the destination is set, extracts a list corresponding to the set destination from among the lists stored in the object DB 112. Then, the determination section 120 compares the object information about the objects included in the extracted list with object information about the respective objects 400 detected by the object detector 116 to determine whether or not there is an object 400 that is not detected by the object detector 116 (namely, the missing object) among the objects included in the list. The notification section 122 provides a predetermined notice when the missing-object determination section 120 identifies a missing object. For example, the notice is provided by generating a missing-object list on a screen of the display device 200. Note that even a missing object included in the list may be withdrawn from management. For example, when a user goes camping, if the user's vehicle is going to meet another vehicle carrying the missing object at the campground which is the destination, the missing object may be deleted from the list. In this case, one or more objects 400 included in the missing-object list are designated by the object designation section 124, and the designated objects can be removed from management. The deleted contents are sent to the object-list edit section 114, and the contents of the list can be updated by reflecting the deleted contents in the list stored in the object DB 112. The operation section 130 performs various kinds of operations for the object management device 100 according to an instruction given by the user. The operation section 130 is incorporated in a housing of the object management device 100. Alternatively, the operation section 130 may be provided by combining the display device 200 and a touch panel.

As shown in FIG. 1, the navigation device 300 includes a facility search processor 310, a route search processor 312, a route guidance processor 314, and an operation section 316. The facility search processor 310 searches for a facility that satisfies a specified search condition. For example, when a genre is designated by operating the operation section 316, the facility search processor 310 extracts a plurality of facilities which belong to the designated genre in order of increasing distance from the vehicle position. The user can select one from among the plurality of facilities thus extracted using the operation section 316. Alternatively, or additionally, when the name or telephone number of a facility is designated using the operation section 316, the facility search processor 310 extracts a facility based on the designated facility name or telephone number. When there is a plurality of facilities corresponding to the name designated, the user can select one from among these facilities using the operation section 316.

The route search processor 312 sets a facility obtained through the facility search result, which has been provided by the facility search processor 310, or a facility or position designated by another method, as the destination for the route search, and carries out the route search process to determine the optimal travel route to the set destination. The route guidance processor 314 performs a route guidance operation for guiding the vehicle along the travel route determined by the route search processor 312. For example, the travel route may be emphasized on the map being displayed. Alternatively, voice guidance and/or an enlarged view of an intersection may be provided when the vehicle is approaching an intersection at which it is to make a right or left turn. The operation section 316 gives various operational instructions to the navigation device 300, and is composed of various keys or switches installed on the housing of the navigation device 300. Alternatively, the operation section may be composed of a remote control unit including various keys. The operation section may be constructed by combining the display device 200 and the touch panel.

The above-mentioned object DB 112 corresponds to a destination-oriented object-list storage section; the navigation device 300 to a destination setting section; the object detector 116 to an object detector; the missing-object determination section 120 to a missing-object determination section; the notification section 122 to a missing-object notification section; the object designation section 124 and the missing-object determination section 120 to an object cancellation section; the object-list edit section 114 to a destination-oriented object-list registration section; the operation section 130 to an operation section; and the RFID reader 110 to a wireless tag reading section. The facility search processor 310 corresponds to a facility search section, and the route search processor 312 to a route search section.

Figure 3:
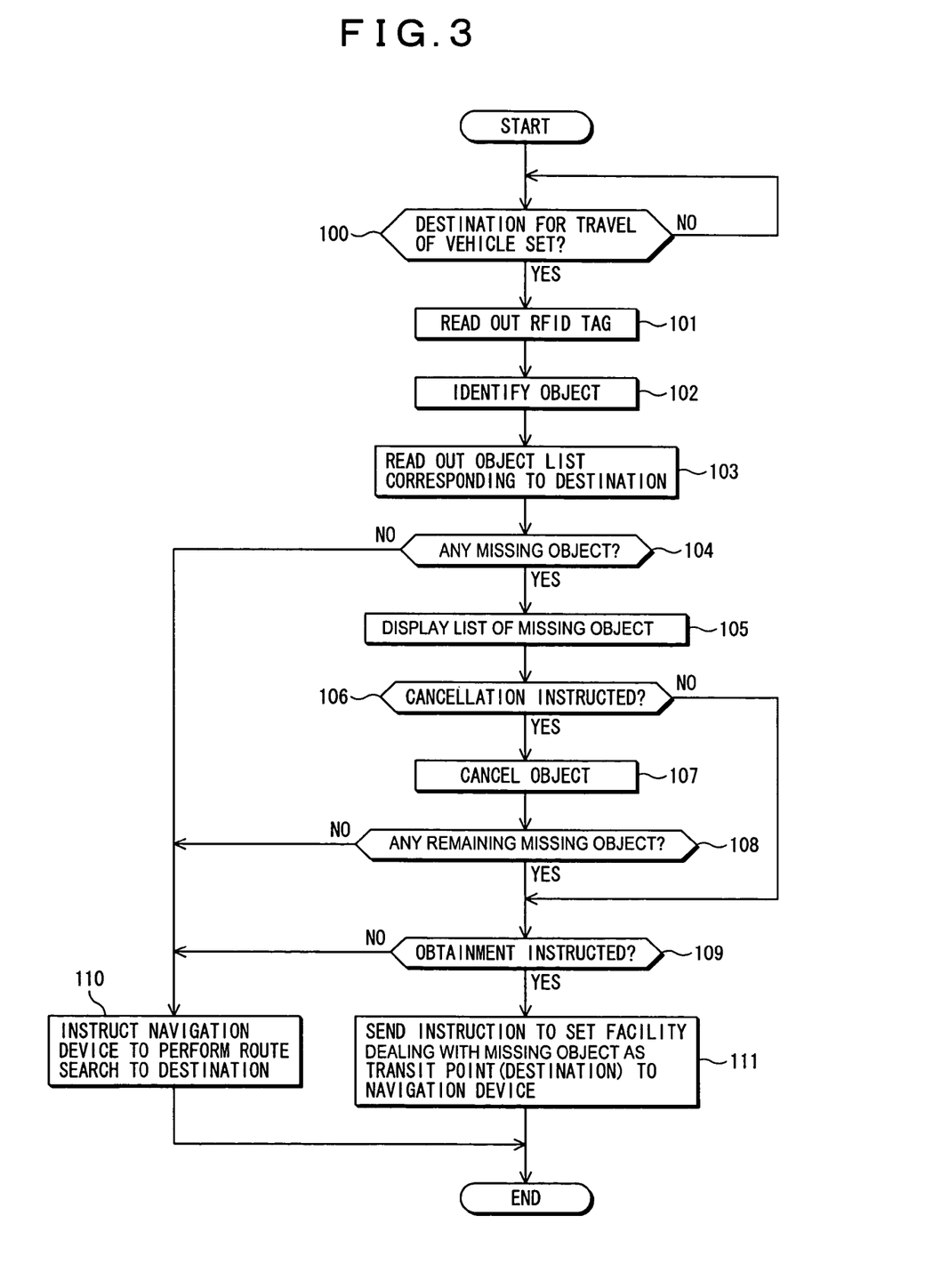
FIG. 3 is a flowchart showing operational steps of the object management apparatus of the embodiment.

Now, the operation of the object management apparatus of the embodiment with the above-mentioned configuration will be described below. FIG. 3 is a flowchart showing operational steps of the object management device 100 of the embodiment.

When a key switch of the vehicle (not shown) is operated to turn on the object management device 100, first the object detector 116 determines whether or not a destination for travel of the vehicle is set (step 100). In the present embodiment, since the destination for the vehicle's travel is set by operating the navigation device 300, the determination is carried out by examining whether or not information about the destination set by the navigation device 300 is sent to the detector. Alternatively, the object detector 116 may be operable to inquire whether or not the destination for the vehicle's travel is set at the navigation device 300. If not, a negative determination is made, and step 100 is performed repeatedly until the destination is set.

If the destination is set, an affirmative determination is made at the determination step 100. Then, the object detector 116 reads object information from RFID tags 410 located within a communicable range using the RFID reader 110 (step 101), and identifies objects 400 with the RFID tags 410 attached thereto (step 102).

Thereafter, the missing-object determination section 120 reads out an object list of necessary objects corresponding to the destination from the object DB 112 (step 103). The determination section then compares the objects 400 included in the list with the objects 400 identified by the object detector 116 to determine whether or not there is any missing object 400 (step 104). If there is a missing object 400, an affirmative determination is made, and the notification section 122 displays a list of the missing objects on a screen of the display device 200 (step 105) to provide a notice (alarm) to the user.

Figure 4:
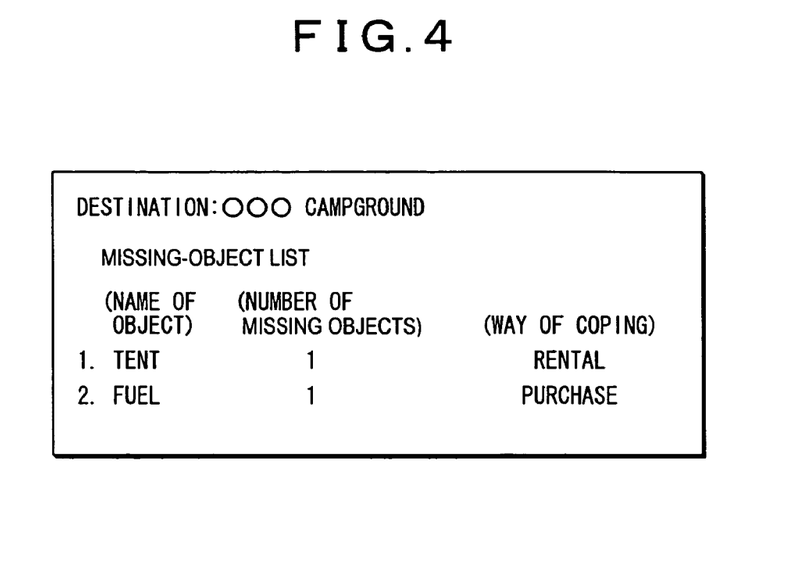
FIG. 4 is a diagram showing a display example of a missing-object list.

FIG. 4 illustrates a display example of the missing-object list. For example, ooo campground is shown to be set as the destination. As shown in FIG. 4, the missing-object list includes the name of the missing object (object's name), the number of missing objects, and the way of coping with obtaining of the missing object.

The missing-object determination section 120 determines whether or not an object 400 to be removed or cancelled from management is designated from among the objects included in the missing-object list, and whether or not cancellation of the designated object is instructed according to the designation (step 106) while the notification section 122 is performing a display operation of the missing-object list. Some objects 400 included in the missing-object list may be unnecessary to the user. In this case, the user gives the cancellation instruction by operating the operation section 130. If so, an affirmative determination is made, and then the missing-object determination section 120 designates the object to be cancelled from the missing-object list according to the operational contents entered by the operation section 130 to perform the cancellation process of the object (step 107). Then, the missing-object determination section 120 determines whether or not there is any remaining missing object (step 108). If there is a remaining missing object, the missing-object determination section 120 makes an affirmative determination to determine whether or not obtaining the missing object is instructed (step 109).

When there is no missing object (that is, when a negative determination is made at the determination step 104), or when the missing object is cancelled from the list (that is, when a negative determination is made at the determination step 108), or when obtaining the missing object is not instructed (that is, when a negative determination is made at the determination step 109), the missing-object determination section 120 instructs the navigation device 300 to perform a route search to the destination (step 110). The route search processor 312 in the navigation device 300 receives the instruction and performs the route search process. The route guidance processor 314 performs a route guidance operation for guiding the vehicle along the travel route obtained through the route search.

When obtaining a remaining missing object is instructed, an affirmative determination is made at the determination step 109. Then, the missing-object determination section 120 sends to the navigation device 300 an instruction to set a facility dealing with the missing object (a facility selling or renting the missing object) as a transit point (step 111). The facility search processor 310 in the navigation device 300 receives the instruction, and searches for a facility dealing with the missing object. The route search processor 312 determines a guidance travel route to the destination with the facility as the transit point through the route search process. The route guidance processor 314 carries out the route guidance operation for guiding the vehicle along the determined travel route. Note that in the above description, a facility dealing with the missing object is searched for by the facility search processor 310. In order to do this, information about facilities is needed which relates a missing object to a facility at which the object can be purchased or rented. To search for a facility corresponding to the designated missing object, it is necessary to know in advance a genre of the facility at which the object can be purchased (e.g., a convenience store, a hardware store, or the like), or a genre of the facility at which the object can be rented (e.g., a rental shop). Such information may be stored in the facility search processor 310. Alternatively, the relative information may be included previously in the object list stored in the object DB 112, and at the operation of step 111, the missing-object determination section 120 may read out this information to transmit it to the navigation device 300. This eliminates the necessity of changing the process contents of the facility search processor 310 in the navigation device 300.

The object list stored in the object DB 112 will be convenient if the necessary object and the number of objects included in the list can be changed depending on the family structure of the user or the like. Now, an edit operation of the contents of the object list will be explained.

Figure 5:
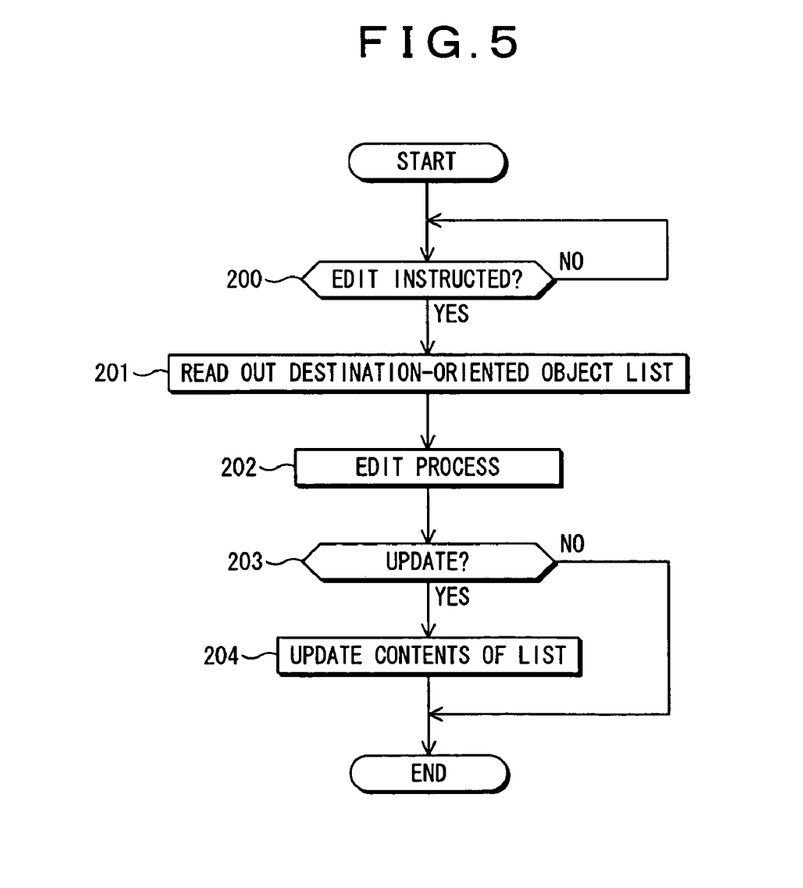
FIG. 5 is a flowchart showing operational steps of editing the object list.

FIG. 5 is a flowchart showing operational steps for editing the object list. The object-list edit section 114 determines whether or not an edit operation is instructed by the user's manipulation of the operation section 130 (step 200). If an edit is not instructed, a negative determination is made, and this determination step is performed repeatedly. If an edit is instructed, an affirmative determination is made at step 200. Then, the object-list edit section 114 reads the object list from the object DB 112 (step 201). Note that as shown in FIG. 2, since the object list is made according to the genre of destination, in reading the list as described above, the user previously designates the genre of destination, and then the object list corresponding to the designated genre is read out.

Thereafter, the object-list edit section 114 performs the edit process of the list read out, based on the operational contents provided by the user's manipulation of the operation section 130 (step 202). For example, as shown in FIG. 2, the edit process may include addition or cancellation of the object itself, modification of the number of objects, cancellation or addition of the essentiality (o mark), or change in designation of the way of coping (rental, purchase, or others). If such an edit process is finished, then the object-list edit section 114 determines whether or not the object list should be updated, using the edited contents (step 203). If an instruction to update the list is given by the user's manipulation of the operation section 130, an affirmative determination is made, and the object-list edit section 114 updates the contents of the object list stored in the object DB 112 (step 204). It is noted that updating the contents of the object list may involve designating a new genre of destination and additionally registering an object list corresponding to the genre designated. This is how the edit process of the object list is completed. If the updating process is discontinued (which may be instructed by the user's manipulation of the operation section 130), a negative determination is made at the determination step 203 without updating the contents of the object list, which ends the edit process.

Accordingly, it is checked whether something is missing or not among the objects carried by the user or brought into the vehicle, based on the necessary objects corresponding to the destination set. If there is a missing object, the user is notified of the missing object, so that the user does not need to examine every object himself/herself, for example, what objects are needed for the destination or whether or not something has been forgotten. This enables the user to reliably and easily confirm the necessary objects without performing a complicated operation.

The notification section 122 provides the notice by displaying the missing-object list, thereby permitting the user to know what is missing simply by looking at the missing-object list, thus saving the user from having to verify the objects actually contained in the vehicle against the list. The displayed missing-object list includes information on essentiality, that is, information indicative of a degree of necessity of each of the missing objects. This enables easy selection of the object that should be preferentially prepared for from among a plurality of missing objects.

An unnecessary object can be designated from among the objects included in the missing-object list and cancelled from the list. Even when it is determined that there are missing objects, an unnecessary object among them can be cancelled or deleted from the list.

The object-list edit section 114 also can be used to register another list depending on a corresponding destination. That is, even if a new destination is added to the storage section and the number of destinations stored in the storage section is increased, the user can confirm the missing objects for the destination. In particular, the object-list edit section 114 is operable to perform an edit operation including addition, modification or cancellation of another object to or from the list, based on operational contents entered by the operation section 130. This can add a necessary object to the list or cancel an unnecessary object from the list depending on the destination, thereby generating a new list reflecting a utilization plan or the like for every user to enhance the accuracy of the displayed contents.

The object information held by the RFID tag 410 attached to the object is read out in the wireless mode using the RFID reader 110. This can automatically read out the object information without removing objects from the vehicle which have been placed in the interior of the vehicle, thereby simplifying reading out of the object information. At the time when the destination is set, the object may be detected. Thus, the detection of the object can be performed appropriately and readily according to the destination.

The facility searched for by the facility search processor 310 of the navigation device 300 can be used as the destination for detection of the object thereby to facilitate setting the desired destination for the detection without performing a complicated operation. Alternatively, the destination for the route search used by the route search processor 312 of the navigation device 300 can be used as the destination for detection of the object, thereby eliminating the necessity of separately setting the destinations for the route search and for the object detection, thus simplifying the setting operation.

Of course, the invention is not limited to the embodiments that have just been described, and various modifications and variations can be envisaged by those skilled in the art without departing from the spirit or scope of the invention. In the embodiment described above, the navigation device 300 sets the destination needed for the object search. In other words, although in the embodiment the destination set when the route search is carried out by the navigation device 300 is also used as the destination for the object detection, the invention is not limited thereto. When the route search is not performed, a facility extracted through the facility search may be used as the destination for the object search.

In the above embodiment, the detection operation of the object is started when the destination is set. Alternatively, or additionally, the detection of objects may be performed when the vehicle starts to travel.

Figure 6:
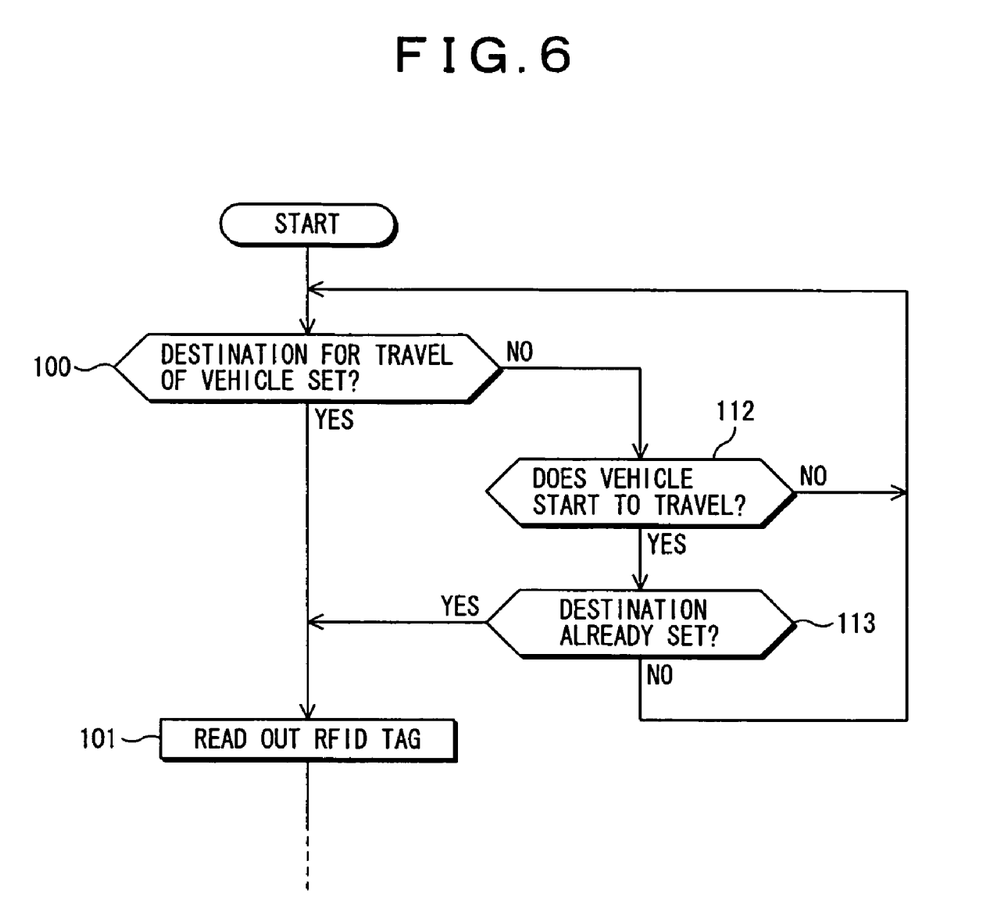
FIG. 6 is a flowchart showing operational steps performed in cases where the detection of missing objects is carried out both at the time of setting a destination and at the start of the vehicle's travel.

FIG. 6 is a flowchart showing operational steps performed in cases where the detection of missing objects is carried out both at the time of setting the destination and of start of the vehicle's travel. Only the portions of the operational steps different from those shown in FIG. 3 are shown in FIG. 6. More specifically, when a negative determination is made at step 100 without setting the destination for the traveling vehicle, the object detector 116 determines whether the vehicle starts to travel or not (step 112). If the vehicle does not start to travel, a negative determination is made, and the operation returns to step 100 to repeatedly determine whether the destination is set or not. If the vehicle starts to travel, an affirmative determination is made at step 112, and then the object detector 116 determines whether or not the destination has already been set using the navigation device 300 (step 113). If the destination is not set yet, a negative determination is made, and the operation returns to step 100 to repeatedly determine whether the destination is set or not. If the destination has already been set, an affirmative determination is made at the step 113, and the operation proceeds to step 101, so that the processes following the reading step of the RFID tag 410 are carried out. As mentioned above, since the detection of missing objects is also performed when the vehicle starts to travel, every time the vehicle starts to travel again after stopping, the detection of objects is carried out to determine the missing object, thereby preventing the objects from being left behind at the transit point or the like until the vehicle reaches the destination.

In the above embodiments, when the missing-object list is displayed and some or all of the objects included in the list are instructed to be withdrawn from management (when an affirmative determination is made at the determination step 106 in FIG. 3), the identified object is cancelled from the displayed missing-object list. The invention is not limited thereto. Note that the cancelled contents may be reflected in the contents of the object list stored in the object DB 112. In this case, the object-list edit section 114 may insert a step corresponding to an edit operation between steps 107 and 108 as shown in FIG. 3, the edit operation being for editing the contents of the object list stored in the object DB 112 based on the cancelled contents of the missing-object list. This can provide the object list next time from which the unnecessary object is deleted, thus eliminating an unnecessary notice and saving the trouble of confirming the contents of the unnecessary notice.

Although in the above embodiments the missing-object list includes the name of object, the number of missing-objects, and the way of coping as shown in FIG. 4, the invention is not limited thereto. The missing-object list may also include facility information (for example, the name and address of a store, or the like) for specifying a facility at which each of the missing objects is available. It should be noted that if the nearest facility at which the missing object is available is intended to be displayed, it is necessary for the facility search processor 310 of the navigation device 300 to search for the facility and to reflect the search results in the contents of the missing-object list.

What is claimed is:
1. An object management apparatus comprising:
   a destination-oriented object-list storage section for storing therein a list of necessary objects depending on a destination;
   a destination setting section for setting the destination for travel of a vehicle;
   an object detector for detecting objects carried by the vehicle;
   a missing-object determination section for determining a list of necessary objects based on a genre associated with the destination set by said destination setting section and for comparing the objects detected by said object detector with the determined list to determine whether any object included in the list is missing or not; and a missing-object notification section for providing a notice when an object is determined to be missing by said missing-object determination section;

wherein said missing-object notification section provides the notice by displaying a list of the missing objects, and the missing-object list included in the notice provided by said missing-object notification section includes information indicative of a degree of necessity of each of the missing objects.

2. The object management apparatus according to claim 1, wherein said destination-oriented object-list storage section stores facility information at which an object included in the list is available, and wherein the notice provided by said missing-object notification section includes facility information corresponding to the missing object.

3. The object management apparatus according to claim 2, further comprising a navigation device including a route search system for setting a specific facility as the destination for the route search section and for performing a route search process with the facility at which a missing object is available being set as a transit point or the destination for the route search.

4. The object management apparatus according to claim 1, further comprising an object cancellation section for designating an unnecessary object from among the objects included in a missing object list and cancelling the designated object from a missing-objects list.

5. The object management apparatus according to claim 4, comprising a destination-orientated object-list updating section for updating contents of a list stored in said destination-orientated object-list storage section, based on contents cancelled by said object cancellation section.

6. The object management apparatus according to claim 1, further comprising a destination-orientated object-list registration section for registering a list in said destination-orientated object-list storage section depending on the destination.

7. The object management apparatus according to claim 6, further comprising an operation section to be manipulated by a user, wherein said destination-orientated object-list registration section is operable to perform an edit operation including addition, modification or cancellation of an object to or from the list, based on operational contents entered by said operation section.

8. An object management apparatus comprising:

a destination-oriented object-list storage section for storing therein a list of necessary objects depending on a destination, where a wireless tag containing object information is attached to an object;

a destination setting section for selling the destination for travel of a vehicle;

an object detector for detecting objects carried by the vehicle;

a wireless tag reading section for reading the object information contained on the wireless tag in a wireless mode, said object detector being operable to detect the object based on the object information read by said wireless tag;

a missing-object determination section for determining a list of necessary objects based on the destination set by said destination setting section and for comparing the objects detected by said object detector with the determined list to determine whether any object included in the list is missing or not; and a missing-object notification section for providing a notice when an object is determined to be missing by said missing-object determination section;

wherein said destination-oriented object-list storage section stores facility information at which an object included in the list is available, and wherein the notice provided by said missing-object notification section includes facility information corresponding to the missing object.

9. The object management apparatus according to claim 8, wherein said wireless tag reading section includes four reading units located at four corners within the interior of the vehicle having a substantially rectangular horizontal section.

10. The object management apparatus according to claim 8, wherein said wireless tag reading section is located near the center of a ceiling within the interior of the vehicle.

11. The object management apparatus according to claim 8, comprising, wherein said wireless tag reading section is located in a trunk of the vehicle.

12. The object management apparatus according to claim 8, wherein said object detector detects the object at a time when the destination is set by the destination selling section.

13. The object management apparatus according to claim 8, wherein said object detector detects the object at a time when the vehicle starts to travel.

14. The object management apparatus according to claim 8, further comprising a navigation device including a facility search section for designating a search condition and searching for a facility, wherein the facility searched for by said facility search section is used as a destination to be set by said destination setting section.

15. The object management apparatus according to claim 14, wherein the navigation device includes a route search section for setting the facility searched for by said facility search section as the destination for the route search and for performing the route search process, wherein the destination set in the route search process is used as the destination to be set by the destination setting section.

16. A method of managing objects for travel of a vehicle comprising:

storing a list of necessary objects depending on a destination;

setting the destination for travel of the vehicle;

detecting objects carried by the vehicle;

determining a list of necessary objects based on the destination set by the destination setting section;

comparing the detected objects with the determined list of necessary objects to determine whether any object included in the list is missing or not; and providing a notice when an object is determined to be missing;

wherein the method further comprises storing information on a facility at which an object included in the list is available, and wherein the notice includes the facility information corresponding to the missing object.

17. The object management method of claim 16, further comprising:

providing an edit operation including addition, modification or cancellation of an object to or from the list.

18. The object management method of claim 16, further comprising:

attaching a wireless tag containing object information to an object to be detected; and reading the object information contained on the wireless tag in a wireless mode to detect the object.

* * * * *